US011414950B2

(12) United States Patent
Gallagher et al.

(10) Patent No.: US 11,414,950 B2
(45) Date of Patent: Aug. 16, 2022

(54) IRIS VALVE TYPE WELL ANNULAR PRESSURE CONTROL DEVICE AND METHOD

(71) Applicant: Kinetic Pressure Control, Ltd., Houston, TX (US)

(72) Inventors: Bobby Gallagher, Houston, TX (US); Steven Angstmann, Houston, TX (US); Billy Gallagher, Houston, TX (US)

(73) Assignee: Kinetic Pressure Control Ltd., Houston, TX (US)

( * ) Notice: Subject to any disclaimer, the term of this patent is extended or adjusted under 35 U.S.C. 154(b) by 61 days.

(21) Appl. No.: 17/057,662

(22) PCT Filed: May 22, 2018

(86) PCT No.: PCT/US2018/033841
§ 371 (c)(1),
(2) Date: Nov. 21, 2020

(87) PCT Pub. No.: WO2019/226155
PCT Pub. Date: Nov. 28, 2019

(65) Prior Publication Data
US 2021/0189826 A1  Jun. 24, 2021

(51) Int. Cl.
*E21B 33/06* (2006.01)
*E21B 21/08* (2006.01)
*E21B 33/08* (2006.01)
*G05D 16/20* (2006.01)

(52) U.S. Cl.
CPC .............. *E21B 33/06* (2013.01); *E21B 21/08* (2013.01); *E21B 33/085* (2013.01); *G05D 16/202* (2013.01)

(58) Field of Classification Search
CPC ........ E21B 33/06; E21B 21/08; E21B 33/085; E21B 33/1208; G05D 16/202; F16K 31/535; F16K 3/03
See application file for complete search history.

(56) References Cited

U.S. PATENT DOCUMENTS

| 2,649,272 | A | 8/1953 | Barbato |
| 4,605,195 | A | 8/1986 | Burton et al. |
| 5,954,089 | A | 9/1999 | Seymour |
| 8,215,613 | B2 * | 7/2012 | Cheung ..................... F02D 9/14 251/212 |
| 8,555,980 | B1 | 10/2013 | Powell |
| 9,890,618 | B1 | 2/2018 | Goodman et al. |
| 10,590,728 | B2 * | 3/2020 | Zonoz ..................... E21B 33/06 |

(Continued)

FOREIGN PATENT DOCUMENTS

WO  2017096101 A1  6/2017

OTHER PUBLICATIONS

International Search Report and Written Opinion, International Application No. PCT/US2018/033841 dated Aug. 27, 2018.

*Primary Examiner* — Brad Harcourt
(74) *Attorney, Agent, or Firm* — Victor H. Segura

(57) ABSTRACT

A well annular pressure control device includes a housing having a through bore and at least two iris valves within the housing. The iris valves comprise a plurality of vanes operable between an open position and a closed position to define an opening. At least one actuator is coupled to the plurality of vanes to move the plurality of vanes between the open position and the closed position.

19 Claims, 16 Drawing Sheets

(56) References Cited

U.S. PATENT DOCUMENTS

| | | | |
|---|---|---|---|
| 2012/0227978 A1* | 9/2012 | Fossli | E21B 43/38 166/363 |
| 2017/0211707 A1 | 7/2017 | Wakayama et al. | |
| 2018/0023361 A1* | 1/2018 | Zonoz | E21B 33/062 251/1.2 |

* cited by examiner

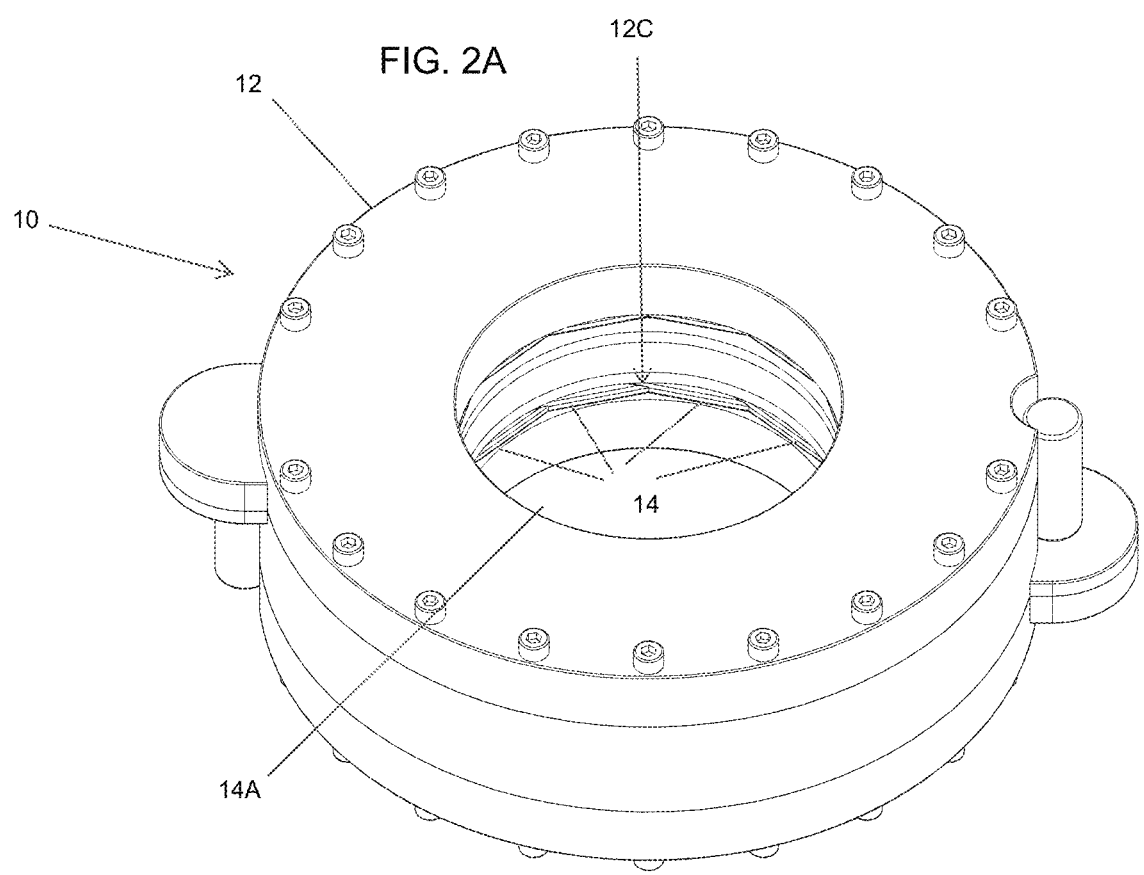

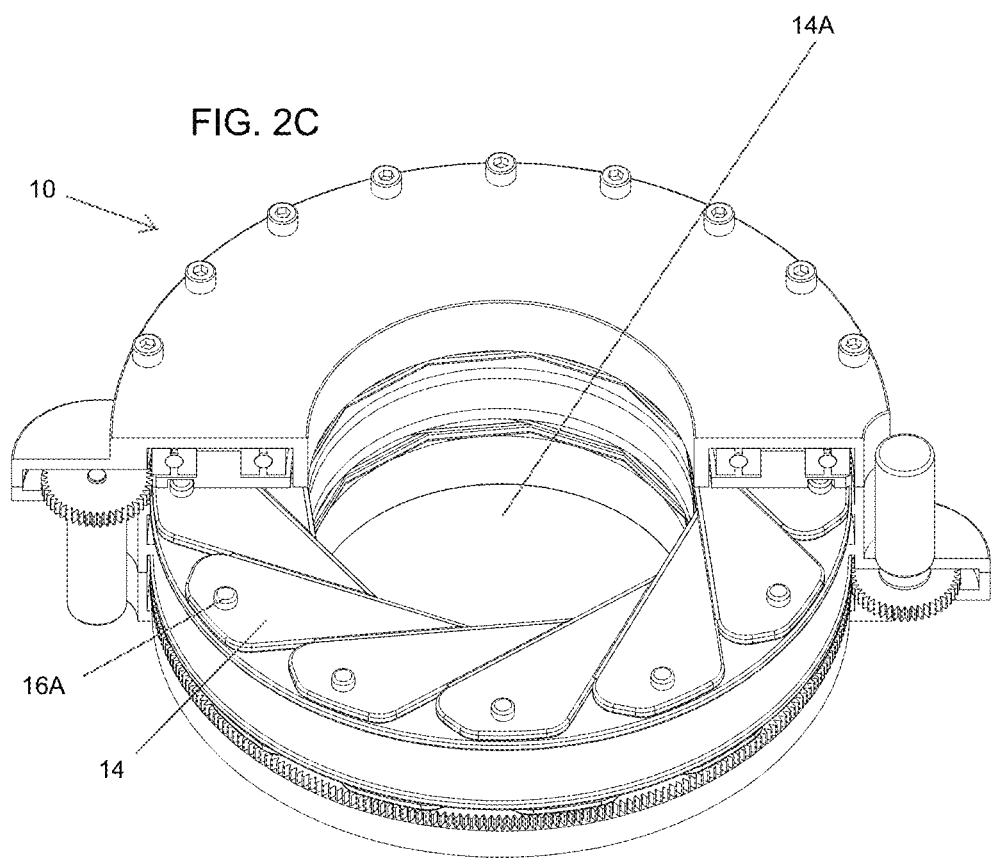

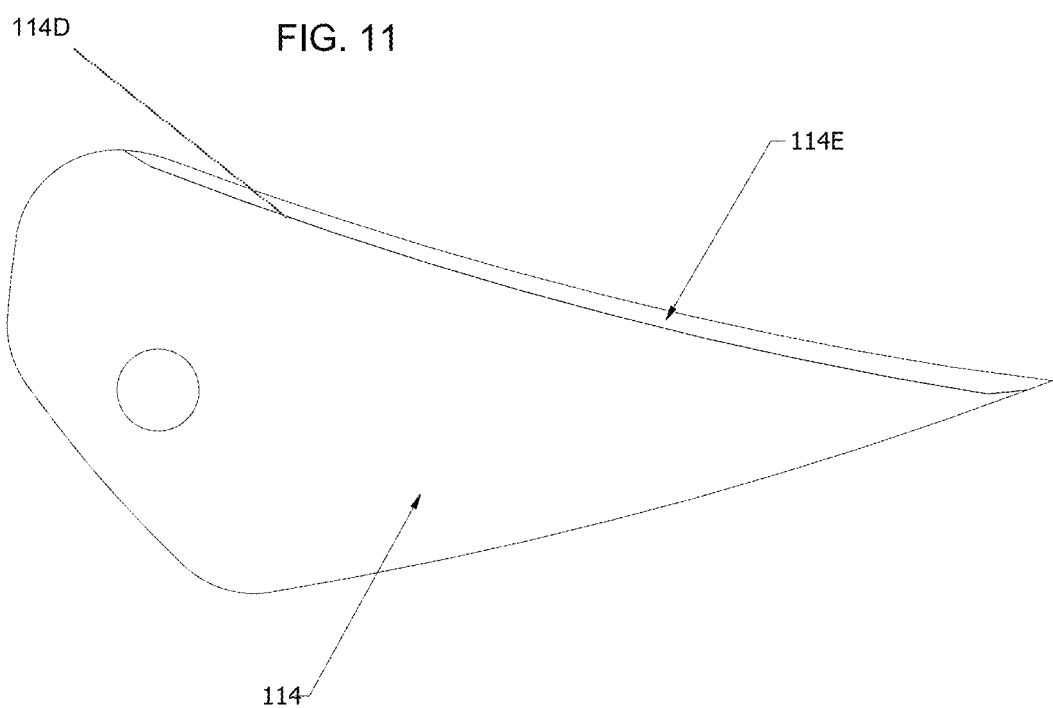

IRIS VALVE TYPE WELL ANNULAR PRESSURE CONTROL DEVICE AND METHOD

CROSS REFERENCE TO RELATED APPLICATIONS

Continuation of International Application No. PCT/US2018/033841 filed on May 22, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure relates to methods and apparatus for drilling and completing oil and gas wells. More particularly, the disclosure relates to well control and pressure management within a wellbore during drilling, completion and related operations.

Presently there are a number of apparatus and methods known in the art for well pressure control and managing wellbore pressure during drilling operations. The methods include pressure control apparatus and methods, and closed loop managed pressure drilling. Well pressure control may be performed by annular or ram-type well pressure control apparatus, known as "blowout preventers" (BOPS), examples of which are described in Rector, U.S. Pat. No. 2,593,793 and Burton et al., U.S. Pat. No. 4,605,195A Annular well pressure control apparatus may have lower pressure ratings, and have expensive, large elastomeric seal elements that require regular replacement. Pipe ram well pressure control apparatus comprise limited diameter ranges for sealing against through-passing pipe, and also cannot seal against diameter upset, such as exist on ordinary threaded connections between adjacent sections ("joints") of pipe. Pipe rams also have no stripping ability, no sealing capability when pipe is not present, and inability to seal in above and below flow directions.

In managed pressure drilling, wellbore annular pressure is actively controlled by operating a variable flow restrictions such as a variable orifice choke in a fluid return line fluidly connected to an annulus between the wall of the wellbore and a pipe string such as a drill string. Due to various tubulars being run in and out of the wellbore, ordinary chokes are not suitable to be directly connected to the wellbore. In order to overcome this constraint, fluid returned from the annulus redirected through a rotating control device ("RCD") similar to that described in, Williams et al., U.S. Pat. No. 5,662,181. The RCD is installed above the BOP and closes the annular space around the drill pipe (or other tubulars) which causes fluid returns to be directed through a system which can control and monitor annular pressure using pumps, chokes, pressure sensors and flow meters.

Managed pressure drilling may provide several advantages over conventional drilling including: Accurate control over bottom hole pressure; reduced occurrence of wellbore problems like ballooning and differential sticking; the ability to drill with reduced drilling fluid density (mud weight); reducing hydraulic friction pressure; and early formation fluid influx ("kick") detection.

A drawback of not being able to have the choke directly installed to the throughbore of the well is the need to use an RCD for wellbore pressure control. Typically, RCDs have elastomeric elements that are used to seal onto the pipe in the wellbore. These elastomeric elements are subject to rapid wear and need to be changed frequently in operations. This adds significant cost to such operations. An additional drawback with managed pressure drilling is that a large number of modifications need to be made to a conventional drilling unit in order to facilitate managed pressure drilling operations. These modifications include substantial pipe work and finding space for rig based managed pressure drilling equipment to be located.

It would be desirable to have an annular pressure control device that could perform the functions of a conventional annular BOP, ram BOP, RCD and choke.

It is desirable to have an annular pressure control device installed directly to the throughbore for managed pressure drilling operations.

It is desirable to have an annular pressure control device that requires a minimum number of drilling unit modifications to be used.

It is desirable to have an annular pressure control device that does not require frequent replacement of elastomeric elements.

SUMMARY

A well annular pressure control device according to one aspect of the disclosure comprises a housing having a through bore and at least one iris valve within the housing.

The iris valve comprises a plurality of vanes operable between an open position and a closed position to define an opening. An actuator is coupled to the plurality of vanes to move the plurality of vanes between the open position and the closed position.

In some embodiments, the actuator comprises a motor rotationally coupled to a cam plate, the cam plate having slots therein engageable with a cam pin on each of the plurality of vanes, wherein the slots are shaped to move the cam pins radially with respect to the through bore when the cam plate is rotated.

Some embodiments further comprise a stationary plate disposed in the housing and arranged to movably support the plurality of vanes.

In some embodiments, the cam plate is rotatably supported in the housing by a bearing.

Some embodiments further comprise a first seal disposed between the housing and the cam plate, a second seal disposed between the cam plate and each of the plurality of vanes and a third seal disposed between the plurality of vanes and the stationary plate.

In some embodiments, the motor comprises at least one of an electric motor, a hydraulic motor and a pneumatic motor.

In some embodiments, the rotatable coupling between the motor and the cam plate comprises a pinion gear on an output shaft of the motor and a ring gear disposed on an outer circumference of the cam plate.

In some embodiments, the peach vane in the plurality of vanes comprises a leading edge, and the leading edge comprises at least one of a seal element, a wear resistant coating and a wear resistant element.

In some embodiments, each of the plurality of vanes comprises a curved leading edge.

In some embodiments, a curvature of the curved leading edge is selected to optimize sealing against a selected diameter pipe.

In some embodiments, each of the plurality of vanes comprises a seal on at least one of a leading edge and a trailing edge, the seal arranged to sealingly engage an adjacent one of the plurality of vanes.

Some embodiments further comprise at least two iris valves disposed in the housing each iris valve comprising a plurality of vanes operable between an open position and a closed position to define an opening and an actuator coupled to the plurality of vanes to move the plurality of vanes between the open position and the closed position.

In some embodiments, each of the iris valves is separately operable to define a corresponding size opening.

In some embodiments, at least one of the plurality of vanes comprises at least one flow orifice, wherein the iris valve enables fluid flow when the plurality of vanes is in the closed position.

In some embodiments, a diameter of the opening defined when the plurality of vanes is in the open position is at least as large as an internal diameter of the through bore.

A method for controlling fluid flow out of a well according to another aspect includes returning fluid pumped into the well through a pipe disposed in the well through an annular space between the pipe and part of the well. An annular control device in the part of the well is operated. The annular control device comprises a housing having a through bore and at least one iris valve within the housing. The iris valve comprises a plurality of vanes operable between an open position and a closed position to define an opening and an actuator coupled to the plurality of vanes to move the plurality of vanes between the open position and the closed position. The plurality of vanes is moved to a selected position to restrict the fluid flow by a selected amount.

In some embodiments the selected position is controlled to maintain a selected fluid pressure in the annular space.

A method for operating an annular control device in a wellbore according to another aspect includes that the annular control device comprises a housing having a through bore and at least two axially separated iris valves within the housing. Each iris valve comprises a plurality of vanes operable between an open position and a closed position to define an opening and an actuator coupled to the plurality of vanes to move the plurality of vanes between the open position and the closed position. The method according to this aspect includes operating a first one of the at least two iris valves to close against a pipe. A second one of the at least two iris valves is closes against an enlarged external diameter feature on the pipe. The pipe is moved longitudinally until the enlarged external diameter feature is disposed proximate the first one of the at least two iris valves. The first one of the at least two iris valves is opened to enable movement of the enlarged external diameter feature into the first one of the at least two iris valves. The pipe is moved until the enlarged external diameter feature clears the second one of the at least two iris valves. The second one of the at least two iris valves is closed against the pipe.

A method for operating an annular control device in a wellbore according to another aspect include the annular control device comprising a housing having a through bore and at least two axially separated iris valves within the housing, each iris valve comprising a plurality of vanes operable between an open position and a closed position to define an opening and an actuator coupled to the plurality of vanes to move the plurality of vanes between the open position and the closed position. The method includes:

a) opening a first one of the at least two iris valves;
b) operating a second one of the at least two iris valves to define an opening smaller than that defined by the fully open position;
c) moving fluid through the first and second iris valves;
d) opening the second iris valve to the fully open position; and
e) closing the first iris valve to define an opening smaller than that defined by the fully open position.

Some embodiments further comprise repeating a) through e) above at selected times to reduce build-up of solids in the annular control device.

Some embodiments further comprise measuring pressure of the fluid and determining presence of solids in the annular control device from the measurements of pressure.

BRIEF DESCRIPTION OF THE DRAWINGS

FIG. 2A shows an oblique view of the iris valve of FIG. 1 wherein vanes are fully opened.

FIG. 2C shows a further cut away view of FIG. 2B to illustrate vanes and cam pins used to move the vanes.

FIG. 11 shows a detailed view of curved face vanes.

DETAILED DESCRIPTION

An annular pressure control device in the form of an iris valve would be suitable for well control and annular pressure control. Such a valve may be called an Annular Control Device or ACD. Iris valves have been developed for use as flow control devices. Iris valves function by constricting flow cross-sectional area, they have a plurality of vanes which can be operated to reduce or block flow of fluids. Iris valves in general are similar to those described in Barbato, U.S. Pat. No. 2,649,272. Iris valves known in the art can only withstand small differential pressures and therefore may not be suitable for use in flow control/choke applications.

It would be desirable for an iris valve to be capable of withstanding large pressure drops and be suitable for high pressure, temperature and sour gas service.

It would be desirable for an iris valve to be able to seal around a tubular in a similar functionality to an annular BOP, ram BOP or RCD.

It would be desirable for an iris valve to be able to handle the cuttings and other solids and fluids produced and interacted with during drilling operations.

Figure 1:
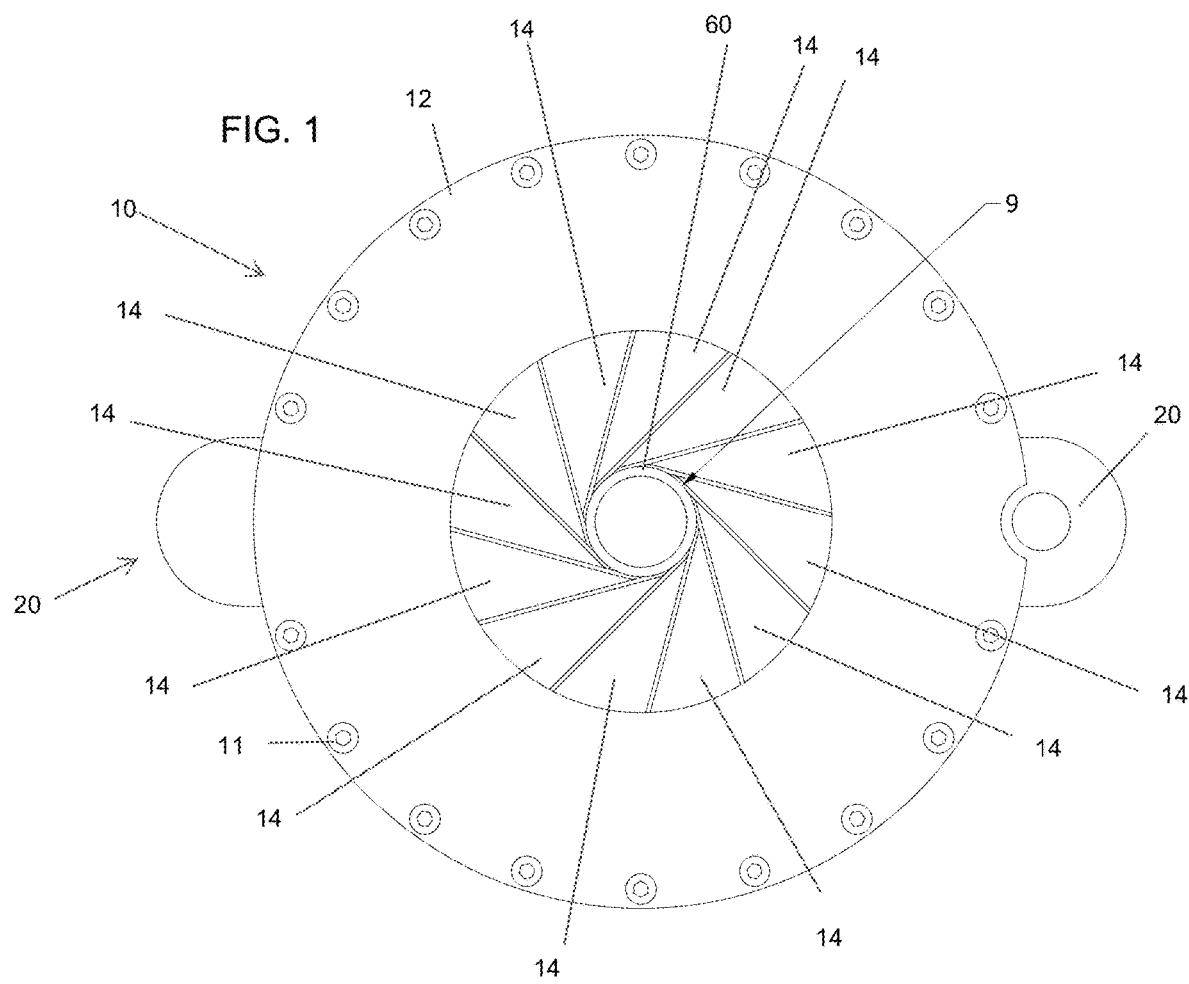
FIG. 1 shows a plan view of an example embodiment of an iris valve according to the present disclosure.

FIG. 1 shows a plan view of an example embodiment of an iris valve ACD according to the present disclosure. The ACD 10 may comprise a housing 12 having features to enable coupling the housing 12 into a riser or other conduit through which it is desired to control flow therethrough, whether a second conduit, shown at 60, is nested in such riser or conduit or the riser or conduit has no such second conduit 60. The housing 12 may define a through bore (12C in FIG. 2A). A plurality of vanes 14 may be moved radially inwardly and outwardly to define an opening (14A in FIG. 2A) having a selectable diameter. In some embodiments, the vanes 14 and the housing 12 may be made from steel or other high strength metal. In some embodiments, the vanes 14 and the housing 12 may be made from material that can withstand degradation when in contact with reactive materials such as acids and hydrogen sulfide.

Components to be described further below may be used to move the vanes 14 between a fully open position and a fully closed position. In some embodiments, the vane movement may be obtained by transmitting rotation of one or more motors 20 to operate the components to move the vanes 14. The motors 20 may be electric motors, pneumatic motors or hydraulic motors, although the type of motor is not intended to limit the scope of the present disclosure. The housing 12 may comprise sections (FIG. 2) held together by cap screws 11 or other suitable fasteners. In FIG. 1, the vanes 14 are shown moved to a position to engage the exterior of the second conduit or pipe 60 so as to close and seal between the housing 12 and the second conduit 60 (represented at 9). In principle, the vanes 14 are shaped such that when all operated simultaneously (as explained below with reference to some embodiments) the vanes 14 define an approximately circular opening having a diameter that may be varied from the same as the through bore in the housing 12 to fully closed so as to stop fluid flow therethrough.

Figure 2:
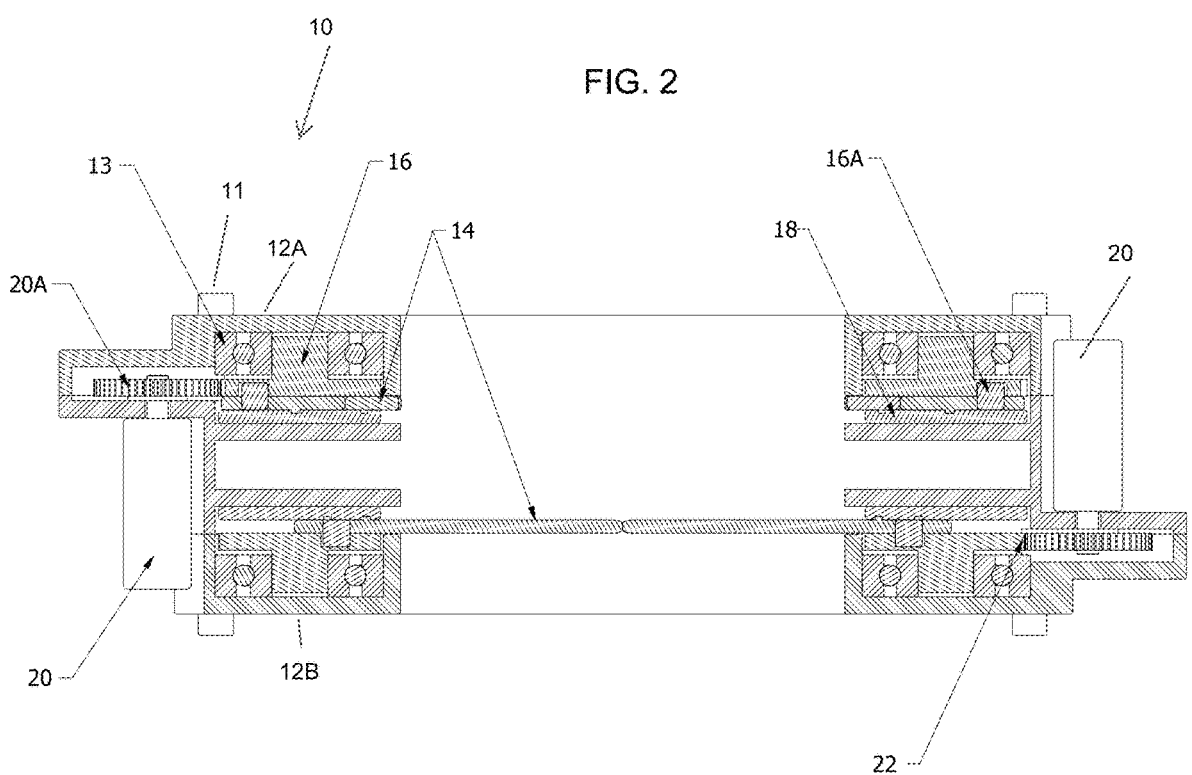
FIG. 2 shows a cross-sectional view of an iris valve as shown in FIG. 1.

FIG. 2 shows a cross-sectional view of an ACD having two iris valves. As explained above, the housing 12 may comprise an upper housing section 12A and a lower housing section 12B, each of which has suitably mounted thereto one of the motors 20. Each motor 20 may rotate a corresponding pinion gear 20A. Each pinion gear 20A may engage a corresponding bull gear or ring gear 22. Each ring gear 22 may be affixed to an outer circumference of a corresponding cam plate 16. Each cam plate 16 may be rotatably supported in the respective housing section 12A, 12B on a respective bearing 13. Each housing section 12A 12B may comprise a respective stationary plate 18 on which a plurality of the vanes 14 as explained with reference to FIG. 1 may movably be placed. The vanes 14 disposed in the upper housing section 12A are shown in the fully opened position; the vanes 14 disposed in the lower housing section 12B are shown in the fully closed position. Each ring gear 22, cam plate 16, set of vanes 14, stationary plate and respective bearing 13 disposed in each of the housing sections 13 are components of a single iris valve. Thus, the embodiment shown in FIG. 2 comprises two iris valves in a single housing 12.

As will be further explained, operating the vanes 14 in the upper housing section 12A and the lower housing section 12B independently to define different diameter openings (e.g., 14A in FIGS. 2C and 2E) may enable moving conduit through the ACD 10 having different diameter features along its length while maintaining fluid seal against the conduit (60 in FIG. 1). While the example embodiment shown in FIG. 2 comprises a rotating cam plate to move the vanes 14 between open and closed positions, any other form of actuator such as linear actuators and corresponding linkages may be used to move the vanes 14 accordingly. As used herein, an "actuator" comprises any one or more devices capable of moving the vanes 14 in any one iris valve between fully open and fully closed positions, preferably synchronously.

FIG. 2A shows an oblique view of the ACD 10 wherein the vanes 14 are moved to the fully open position so as to define an opening 14A that traverses a full internal diameter of the housing 12. Having the capability to open to such diameter enables the ACD 10 according to the present disclosure to have passed therethrough larger diameter conduit and other devices than may be possible using certain types of BOP and RCDS known in the art.

Figure 2B:
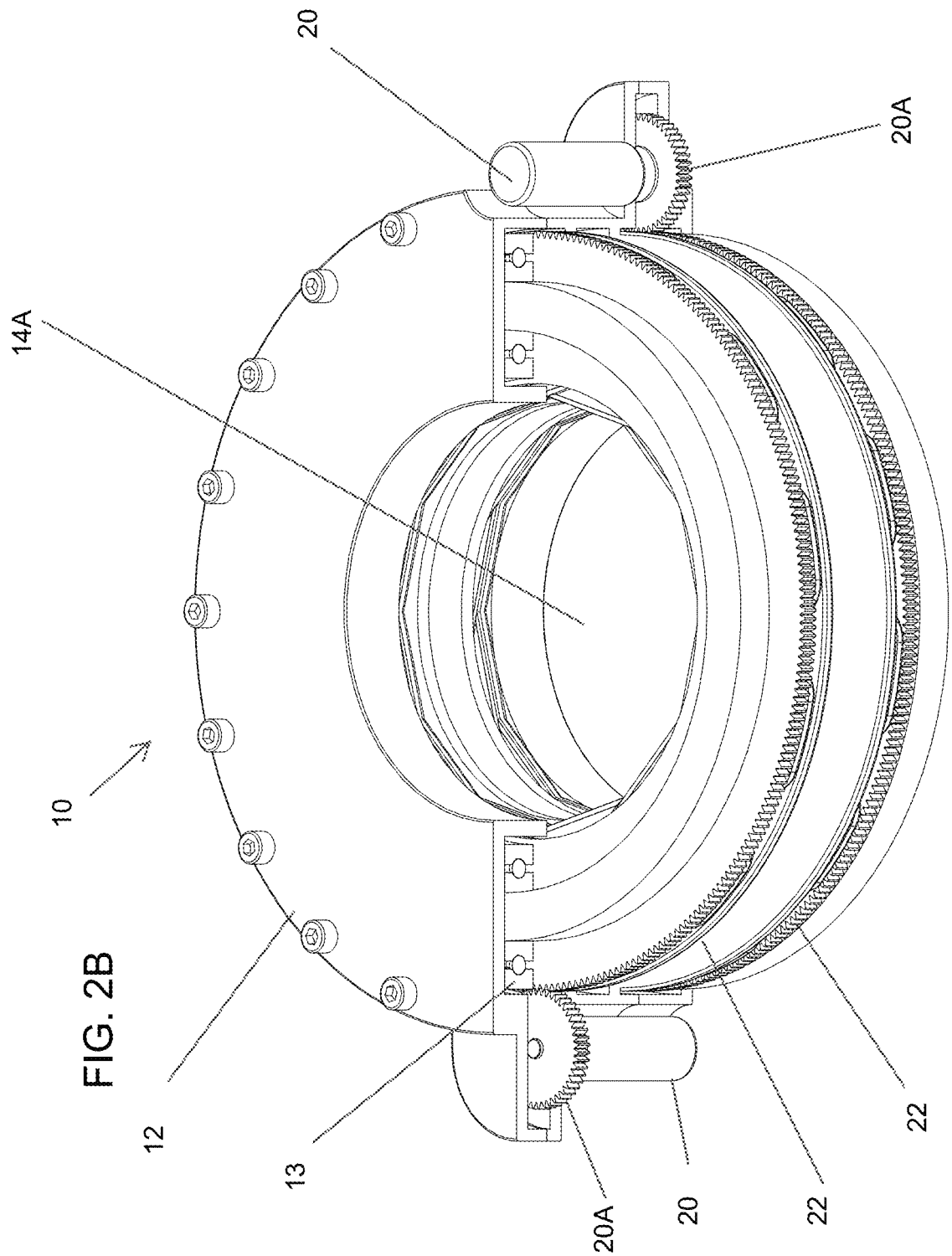
FIG. 2B shows a cut away portion of the view in FIG. 2A to illustrate a ring gear, bearings and motors.

FIG. 2B shows a cut away portion of the view in FIG. 2A to illustrate the ring gears 22, bearings 13 and motors 20. The ACD 10 in FIG. 2B is shown in the fully opened position to define an opening 14A as explained with reference to FIG. 2A.

Figure 2D:
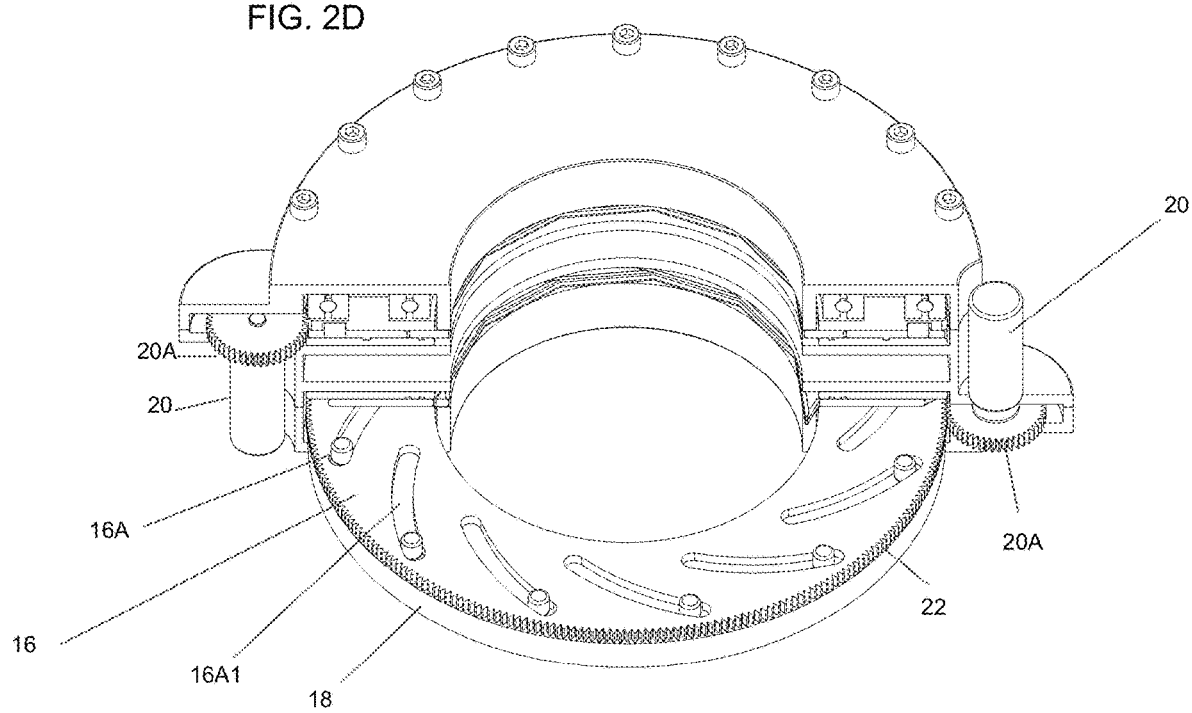
FIG. 2D shows a cam plate used to move the cam pins shown in FIG. 2C.

FIG. 2C shows a further cut away view of FIG. 2B to illustrate the vanes 14 and cam pins 16A used to move the vanes 14. FIG. 2D shows the cam plate 16 used to move the cam pins 16A shown in FIG. 2C. As the motor 20 turns the pinion gear 20A, the ring gear 22 is correspondingly rotated. Such corresponding rotation rotates the cam plate 16, which is coupled to the ring gear 22. Rotating the cam plate 16 causes slots 16A1 in the cam plate 16 to move with respect to the correspondingly engaged cam pin 16A. Slots 16A1 arranged as shown in FIG. 2D when moved with respect to each corresponding cam pin 16A causes each corresponding cam pin 16A to move radially with respect to the fixed plate 18, thereby moving each corresponding vane (14 in FIG. 2C) to move inwardly or outwardly. Such motion as explained above changes the diameter of an opening (14A in FIG. 2C) defined by the vanes (14 in FIG. 2C).

Figure 2E:
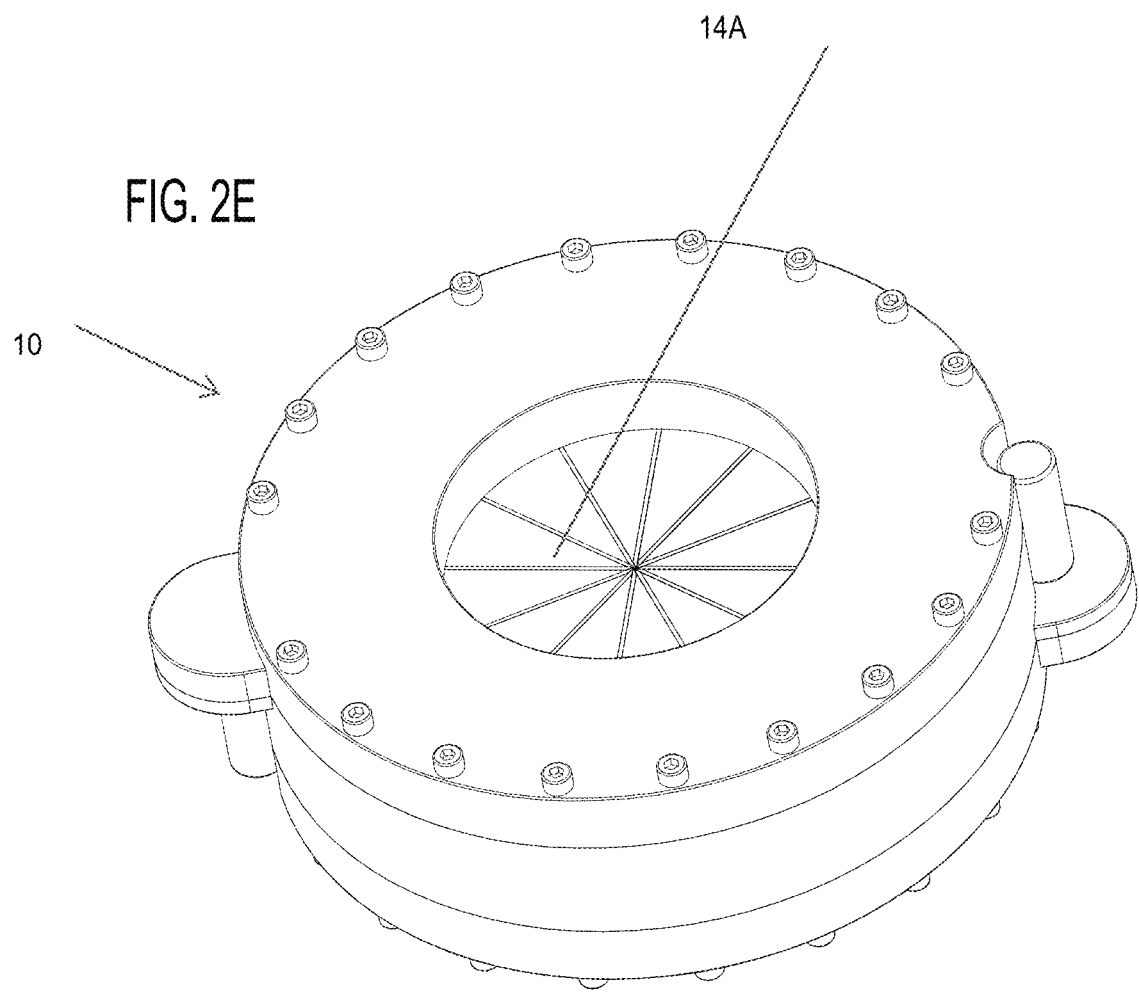
FIG. 2E shows another view of the iris valve of FIG. 2B wherein the vanes are fully closed.

FIG. 2E shows another view of the iris valve of FIG. 2B wherein the vanes are fully closed.

Figure 3:
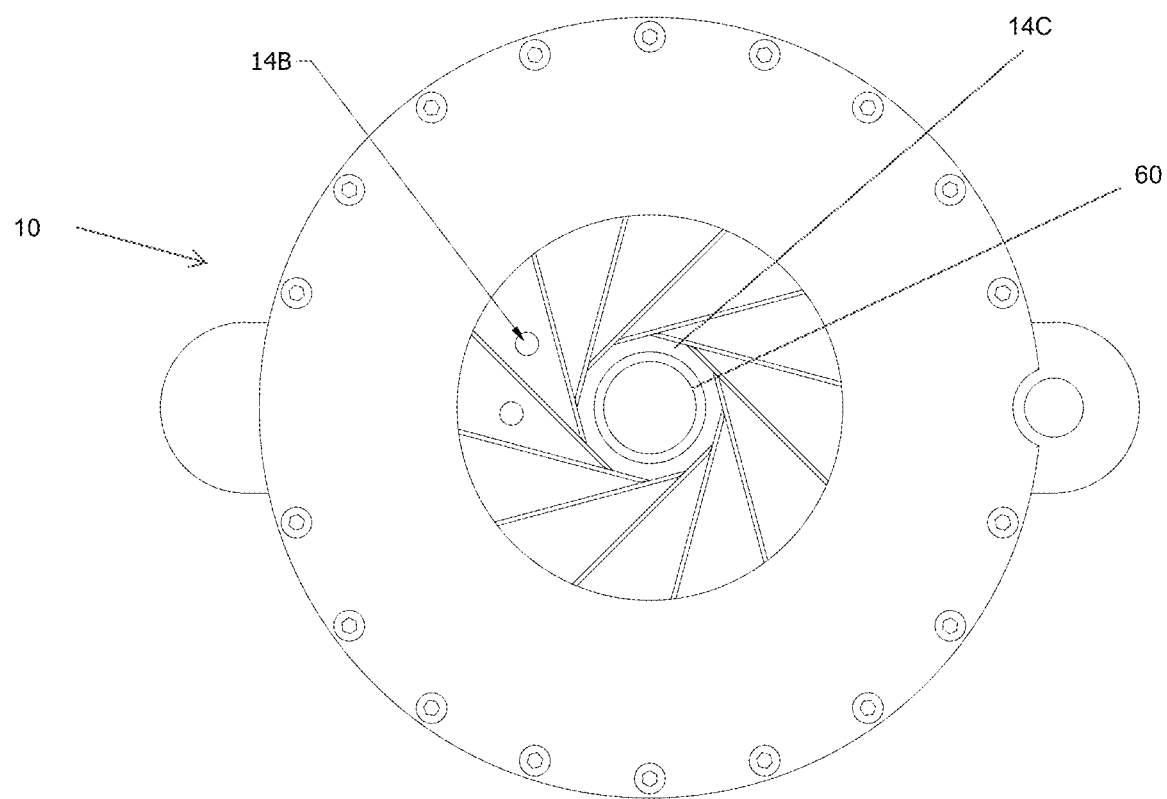
FIG. 3 shows one embodiment having flow orifices in one or more vanes and wherein an annular flow space may be maintained between the vanes and a pipe string.

FIG. 3 shows one embodiment having flow orifices 14B in one or more vanes 14 and wherein an annular flow space 14C may be maintained between the vanes 14 and a pipe or conduit 60. The flow orifices 14B may provide that the ACD 10 does not fully close fluid flow, even when the vanes 14 are fully closed against the pipe 60, e.g., as shown in FIG. 1. In the example embodiment shown in FIG. 3, fluid flow through the ACD 10 may be maintained at a selected rate above that enabled by full closure of the vanes 14 by maintaining the annular flow space 14C at a selected width. For example, the width of the annular flow space 14C may be maintained at a selected amount. In some embodiments, the annular clearance between the vanes and the pipe may be maintained between 0.000" and 0.500". In some embodiments, the width may be greater than 0.500".

In some embodiments, a fluid flow back pressure created and controlled by closing the vanes 114 as shown in FIG. 3 may be between zero and 2,500 pounds per square inch (psi). In some embodiments, the width may be automatically adjusted in response to estimated and/or measured pressure in a well. Some embodiments may withstand pressure differential across the ACD in excess of 2,500 psi.

Figure 4:
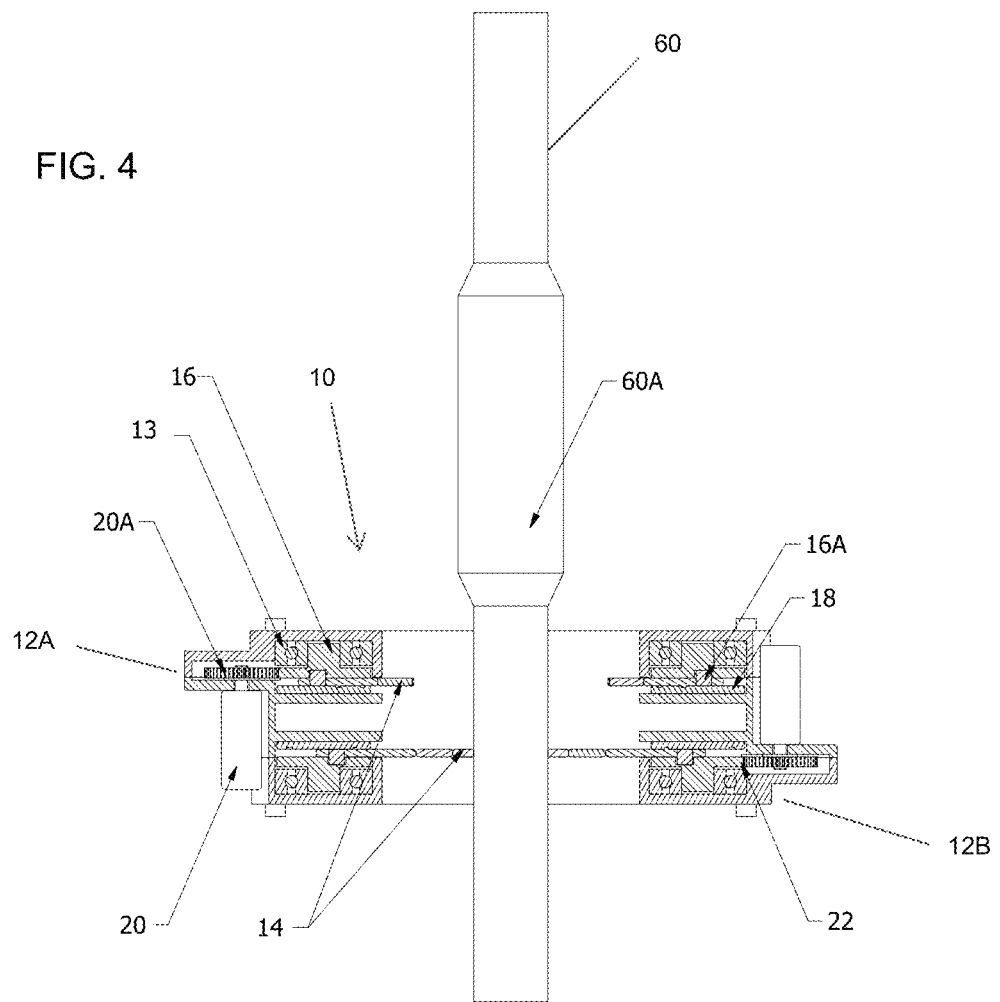
FIG. 4 shows a view as in FIG. 2 wherein opening vanes in the iris valve of FIG. 2 may be sequenced to maintain closure while running a tool joint.

FIG. 4 shows a view as in FIG. 2 wherein opening vanes in the iris valve of FIG. 2 may be sequenced to maintain closure while running a tool joint. As shown in FIG. 4, the vanes 14 in the upper housing section 12A may be opened to enable free passage of the pipe or conduit 60. The pipe or conduit 60 may include an enlarged outer diameter section 60A such as threaded couplings disposed at each longitudinal end of each segment ("joint") of the pipe or conduit 60. One example of such enlarged outer diameter section 60A is known as a "tool joint." As the pipe 60 is moved downwardly through the ACD 10, the vanes 14 in the lower housing section 12B may be closed against the pipe 60 while the tool joint 60A is free to move through the open vanes 14 in the upper housing section 12A until it is adjacent to the vanes 14 in the lower housing section 12B. At such time, the vanes 14 in the upper housing section 12A may be closed against the tool joint 60A while the vanes 14 in the lower housing section 12B are opened to enable passage of the tool joint 60A. When the tool joint 60A moved longitudinally below the vanes 14 in the upper housing section 12A, the vanes 14 in the upper housing section 12A may be closed against the pipe 60.

Opening the vanes in the iris valve of FIG. 2 as explained above may also be used to avoid, reduce or alleviate build-up of drill cuttings and other solid material so as to restrict flow between the vanes 14 and a pipe 60 disposed within the ACD 10. While fluid is being pumped through the pipe 60 and returned in the annular space between the well and the pipe 60, the vanes 14 in the lower housing section 12B may be opened, in some embodiments to the fully opened position (see FIG. 2A and accompanying description). The vanes 14 in the upper housing section 12A may be moved to a selected position so as to fully seal against the pipe 60 (see FIG. 1) or to provide a selected annular flow space (see FIG. 3 and accompanying description) wherein a selected wellbore fluid pressure may be maintained while fluid is being pumped into the pipe 60 and thereby into the well below. If measured fluid pressure is within a selected threshold difference from an expected pressure (based on, among other parameters, fluid properties, well length, pumping pressure and annular flow space cross sectional area), it may be concluded that the upper iris valve in the ACD is operating correctly. Then the vanes 14 in the lower housing section 12B may be opened, e.g., in some embodiments to the fully opened position and the vanes 14 in the upper housing section 12A may be closed to the same aperture as were the vanes in the lower housing section previously. Measuring pressure may be repeated to confirm operation of the upper iris valve in the ACD 10. In some embodiments, the vanes in the upper housing section and the lower housing section may be operated as described without measuring pressure; such operation may be performed at selected times so as to alleviate cuttings build-up before a problem occurs.

Figure 5:
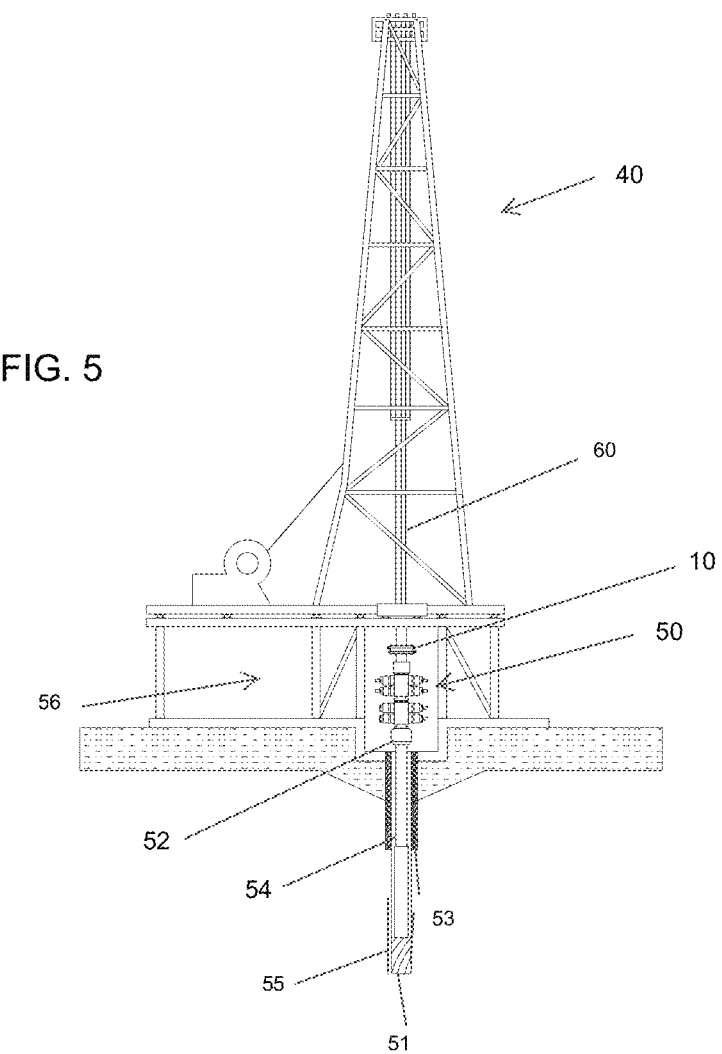
FIG. 5 shows an iris valve assembled to a BOP on a land-based drilling unit.

FIG. 5 shows an ACD 10 assembled to a BOP stack 50 on a land-based drilling unit 40. The BOP stack 50 may be coupled at one longitudinal end to a casing head or flange 52. The ACD 10 may be coupled directly to or spaced apart from the other longitudinal end of the BOP stack 50. The BOP stack 50 may comprise any combination of ram type closure elements, e.g., blind rams, shear rams and/or pipe rams. The casing head or flange 52 may form an upper end of a well casing 54. A drill bit 51 disposed on one end of the pipe 60 may drill formations to lengthen a well 55. Fluid returning from the well 55 may enter an annular space 53 between the well 55 (and subsequently the casing 54) and the pipe 60. The ACD 10 may be used to control flow between the pipe 60 and a corresponding annular space above the casing head or flange 52. Such flow control may be used to control well annulus pressure.

Figure 6:
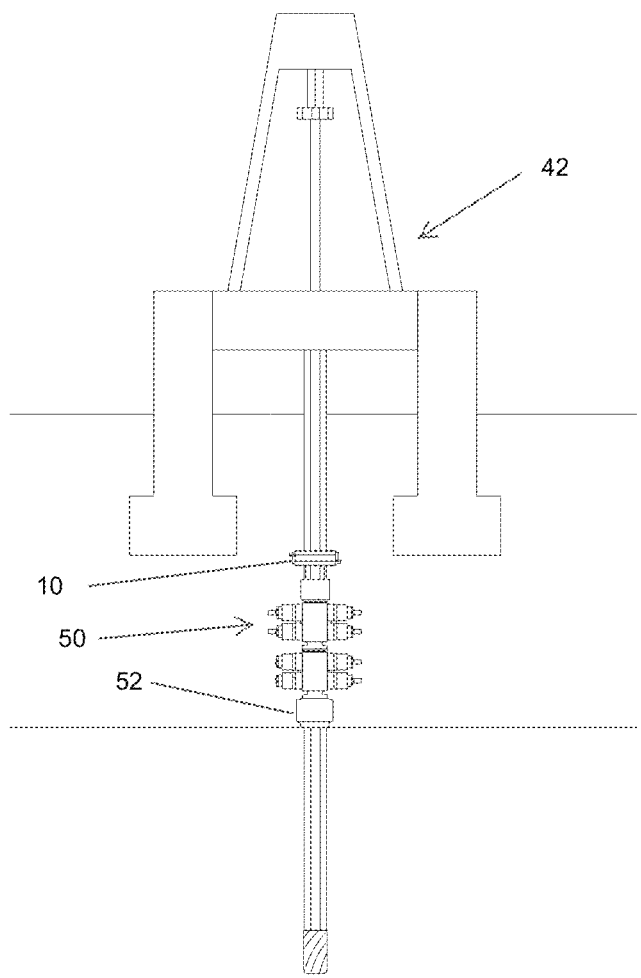
FIG. 6 shows an iris valve assembled to a BOP stack coupled to a subsea wellhead.

FIG. 6 shows an ACD 10 assembled to a BOP stack 50 coupled to a subsea wellhead 52 disposed below a floating platform 42 in marine applications. In the embodiments shown in FIG. 5 and FIG. 6, an ACD 10 as explained herein may be used in conjunction with or in substitution of any one or more components of the respective BOP stacks 50.

In embodiments such as shown in FIG. 5 and FIG. 6, fluid returning from the well and flowing in the annular space between the pipe and the well/casing/BOP stack and ACD may be throttled by operating the ACD as explained above. In some embodiments, a fluid discharge line (56 in FIG. 5) may be coupled to the annular space below the ACD 10 so that the ACD 10 may be used as a rotating control device (RCD). In some embodiments the ACD 10 may be operated to enable flow at all times through the annular space, such as explained with reference to FIG. 1 and FIG. 3. In some embodiments, the ACD may be operated to control a width of the annular flow space (14C in FIG. 3) to maintain a selected fluid pressure in the annular space, and thereby in the well (55 in FIG. 5).

Figure 7:
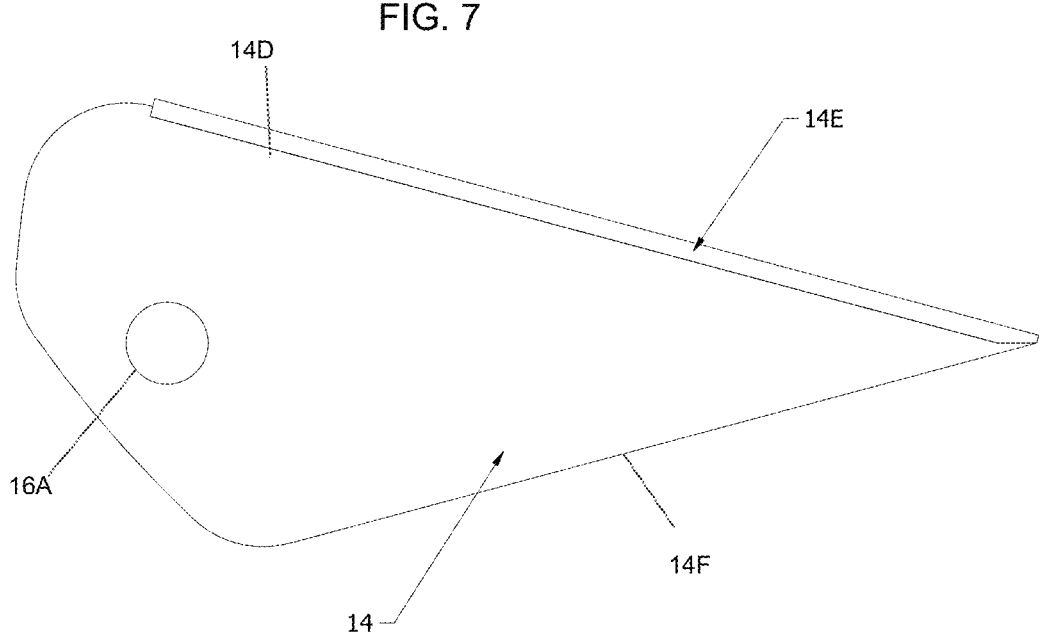
FIG. 7 shows a detailed view of one of the vanes.

FIG. 7 shows a detailed view of one of the vanes 14. Each vane 14 may comprise a leading edge 14D, a trailing edge 14F and a cam pin 16A. The leading edge 14D may comprise any combination of a seal element 14E such as may be made from elastomer or other seal material and/or a wear resistant coating or layer. The leading edge 14D is in contact with the trailing edge 14F of an adjacent vane 14. Thus, the vanes 14 may sealingly engage each other such that when fully closed against a pipe (FIG. 1) or fully closed against each other (FIG. 2E), a fluid tight seal is created.

Figure 8:
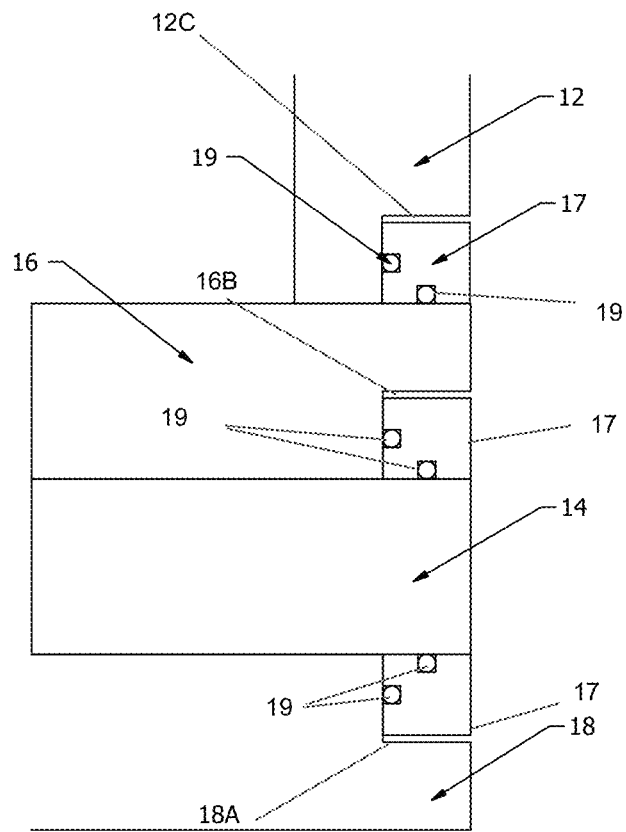
FIG. 8 shows a cross-sectional view of seal elements engaged with a vane, the cam plate, the stationary plate and the housing of an iris valve.

FIG. 8 shows a cross-sectional view of seal elements engaged with a vane 14, the cam plate 16, the stationary plate 18 and the housing 12 of an ACD according to the present disclosure. A feature 12C may be formed in the housing 12 to enable placement of a seal carrier 17 having thereon seal elements 19 such as O-rings to sealingly engage adjacent components, e.g., the housing 12 and the cam plate 16. A similar feature 16B may be formed in the cam plate 16 for engaging a similar seal carrier 17 and seal elements 19 between the cam plate 16 and the vanes 14. A similar feature 18A may be formed in the stationary plate 18 to engaging a similar seal carrier 17 and seal elements 19 between the vanes 14 and the stationary plate 18. Having such seal elements may enhance the capacity of the ACD (10 in FIG. 1) to fully close to fluid flow by creating a fluid tight seal when the vanes 14 are closed as shown in FIG. 1 or FIG. 2E.

Figure 9:
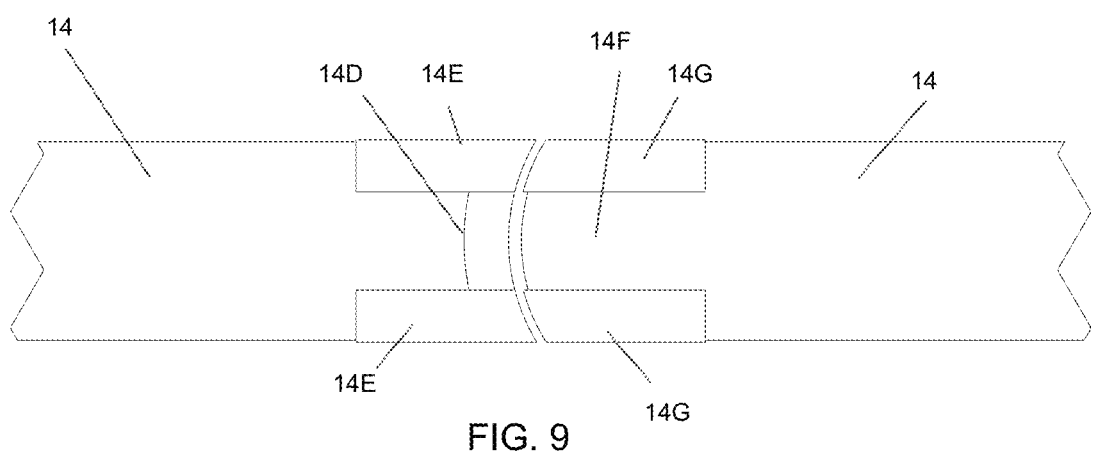
FIG. 9 shows an example embodiment of seals that may be used between adjacent vanes.

FIG. 9 shows an example embodiment of seals that may be used between adjacent vanes. The leading edge 14D of one vane 14 may comprise a concave profile. An upper surface and lower surface of the leading edge 14D may comprise respective seal elements 14E which may be substantially as explained with reference to FIG. 7. In some embodiments, the entire leading edge 14D may have a seal element 14E disposed therein as explained with reference to FIG. 7. The trailing edge 14F of the adjacent vane 14 may have a convex profile and be arranged to contact the leading edge 14D of the previously described vane 14. Seal elements 14G may be disposed on the upper and lower surfaces of the trailing edge 14F or may cover the entire trailing edge. Thus, irrespective of the position of the vanes 14, the corresponding edges 14D, 14F sealingly engage each other.

Figure 10:
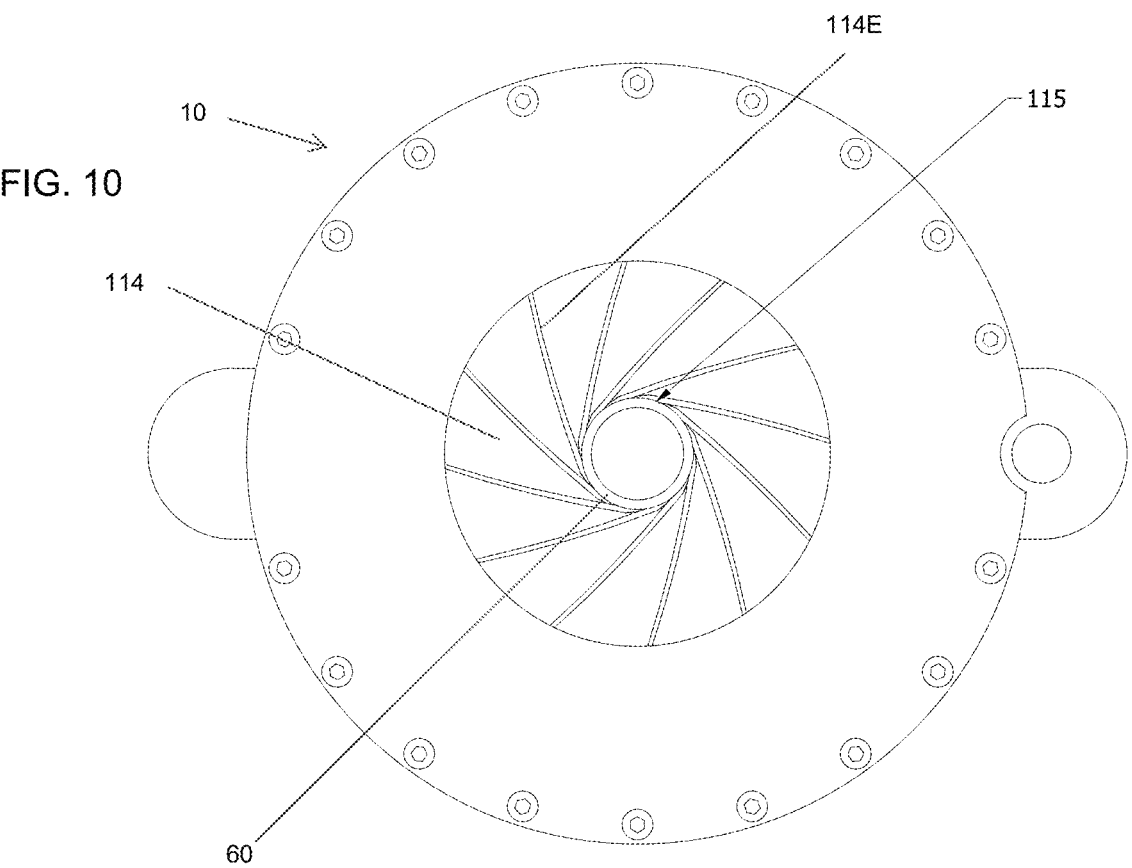
FIG. 10 shows an embodiment having curved face vanes to enhance sealing against a pipe passing through the iris valve.

FIG. 10 shows an embodiment of the ACD 10 having curved leading-edge vanes 114 to enhance sealing against a pipe 60 passing through the vanes 114 (represented at 115). FIG. 11 shows one of the vanes 114 in more detail wherein curvature in leading edge 114D is visible. In some embodiments, the curvature of the leading edge 114D may be chosen to optimize sealing against a particular outer diameter of pipe.

An ACD including an iris valve according to the present disclosure may be capable of withstanding large pressure drops and may be suitable for high pressure, temperature and sour gas service. Such ACD having an iris valve may be able to seal around a pipe in a similar manner as an annular BOP, a pipe ram BOP or an RCD. An ACD according to the present disclosure having an iris valve may be able to withstand abrasion from drill cuttings and other solids and fluids produced and interacted with during drilling operations.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A well annular pressure control device, comprising:
   a housing having a through bore and at least two iris valves within the housing;
   each iris valve comprising a plurality of vanes operable between an open position and a closed position to define an opening;
   wherein at least one vane of the plurality of vanes comprises at least one flow orifice;
   at least one actuator coupled to the plurality of vanes to move the plurality of vanes between the open position and the closed position,
   wherein each of the iris valves is separately operable to define a corresponding size opening.

2. The device of claim 1 wherein the at least one actuator comprises a motor rotationally coupled to a cam plate, the cam plate having slots therein engageable with a cam pin on each of the plurality of vanes, wherein the slots are shaped to move the cam pins radially with respect to the through bore when the cam plate is rotated.

3. The device of claim 2 further comprising at least one stationary plate disposed in the housing and arranged to movably support a set of the plurality of vanes.

4. The device of claim 2 wherein the cam plate is rotatably supported in the housing by a bearing.

5. The device of claim 2 wherein the motor comprises at least one of an electric motor, a hydraulic motor, and a pneumatic motor.

6. The device of claim 2 wherein the rotatable coupling between the motor and the cam plate comprises a pinion gear on an output shaft of the motor and a ring gear disposed on an outer circumference of the cam plate.

7. The device of claim 1 further comprising a first seal disposed between the housing and the cam plate, a second seal disposed between the cam plate and each of the plurality of vanes and a third seal disposed between the plurality of vanes and the stationary plate.

8. The device of claim 1 wherein the plurality of vanes each comprise a leading edge, the leading edge comprising at least one of a seal element, a wear resistant coating and a wear resistant element.

9. The device of claim 1 wherein each of the plurality of vanes comprises a curved leading edge.

10. The device of claim 9 wherein a curvature of the curved leading edge is selected to optimize sealing against a selected outer diameter pipe.

11. The device of claim 1 wherein each of the plurality of vanes comprises a seal on at least one of a leading edge and a trailing edge, the seal arranged to sealingly engage an adjacent one of the plurality of vanes.

12. The device of claim 1 wherein multiple vanes of the plurality of vanes each comprise at least one flow orifice, wherein at least one of the iris valves enables fluid flow when the plurality of vanes are in the closed position.

13. The device of claim 1 wherein a diameter of the opening defined when a plurality of vanes are in the open position is at least as large as an internal diameter of the through bore.

14. A method for operating an annular control device in a wellbore, the annular control device comprising a housing having a through bore and at least two axially separated iris valves within the housing, each iris valve comprising a plurality of vanes operable between an open position and a closed position to define an opening and at least one actuator coupled to the plurality of vanes to move the plurality of vanes between the open position and the closed position, the method comprising:
   operating a first one of the at least two iris valves to close toward a pipe;
   operating a second one of the at least two iris valves to close toward an enlarged external diameter feature on the pipe;
   moving the pipe longitudinally until the enlarged external diameter feature is disposed proximate the first one of the at least two iris valves;
   opening the first one of the at least two iris valves to enable movement of the enlarged external diameter feature into the first one of the at least two iris valves;
   moving the pipe until the enlarged external diameter feature clears the second one of the at least two iris valves; and
   operating the second one of the at least two iris valves to close toward the pipe.

15. The method of claim 14 further comprising changing an amount of opening of at least one of the first iris valve and the second iris valve to maintain a selected pressure in an annular space in the wellbore.

16. A method for operating an annular control device in a wellbore, the annular control device comprising a housing having a through bore and at least two axially separated iris valves within the housing, each iris valve comprising a plurality of vanes operable between an open position and a closed position to define an opening and at least one actuator coupled to the plurality of vanes to move the plurality of vanes between the open position and the closed position, the method comprising:
   a. opening a first one of the at least two iris valves;
   b. operating a second one of the at least two iris valves to define an opening smaller than that defined by the fully open position;
   c. moving fluid through the first and second iris valves;
   d. opening the second iris valve to the fully open position; and
   e. closing the first iris valve to define an opening smaller than that defined by the fully open position.

17. The method of claim 16 further comprising repeating a) through e) at selected times to reduce build-up of solids in the annular control device.

18. The method of claim 16 further comprising measuring pressure of the fluid and determining presence of solids in the annular control device from the measurements of pressure.

19. The method of claim 16 further comprising changing an amount of opening of one or both of the axially separated iris valves to maintain a selected pressure in an annular space in the wellbore.

* * * * *